US009963141B2

(12) United States Patent
Yamamoto et al.

(10) Patent No.: US 9,963,141 B2
(45) Date of Patent: May 8, 2018

(54) HYBRID VEHICLE CONTROL DEVICE WITH TRANSMISSION CONTROL FOR A LEVEL DIFFERENCE OF A ROAD SURFACE

(71) Applicant: Nissan Motor Co., Ltd., Yokohama-shi, Kanagawa (JP)

(72) Inventors: Akihiro Yamamoto, Hiratsuka (JP); Morihiro Nagamine, Kanagawa (JP); Akira Takano, Kanagawa (JP); Shintaro Oshio, Kanagawa (JP); Yoshihisa Kodama, Sagamihara (JP); Takuro Hirano, Gotemba (JP); Yukifumi Otsuka, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 15/121,827

(22) PCT Filed: Jan. 28, 2015

(86) PCT No.: PCT/JP2015/052330
§ 371 (c)(1),
(2) Date: Aug. 26, 2016

(87) PCT Pub. No.: WO2015/141286
PCT Pub. Date: Sep. 24, 2015

(65) Prior Publication Data
US 2017/0066437 A1    Mar. 9, 2017

(30) Foreign Application Priority Data
Mar. 20, 2014  (JP) ................................. 2014-057585

(51) Int. Cl.
*B60W 20/00* (2016.01)
*B60K 6/42* (2007.10)
(Continued)

(52) U.S. Cl.
CPC ............. *B60W 20/30* (2013.01); *B60K 6/387* (2013.01); *B60K 6/48* (2013.01); *B60K 6/543* (2013.01);
(Continued)

(58) Field of Classification Search
CPC ...... B60W 20/30; B60W 10/02; B60W 10/06; B60W 10/08; B60W 10/10; B60W 10/18;
(Continued)

(56) References Cited

U.S. PATENT DOCUMENTS

2009/0234549 A1   9/2009 Silveri et al.
2014/0019027 A1   1/2014 Kojima
(Continued)

FOREIGN PATENT DOCUMENTS

CN   103476631 A   12/2013
CN   103569115 A   2/2014
(Continued)

*Primary Examiner* — Adam D Tissot
(74) *Attorney, Agent, or Firm* — Global IP Counselors, LLP

(57) ABSTRACT

A hybrid vehicle control device is provided with at least one controller programmed to control outputs of the engine and the electric motor, an engagement and disengagement of the clutch, and a transmission ratio of the continuously variable transmission in accordance with a driving state. The at least one controller is further programmed to restart the engine while maintaining a released state of the clutch, and downshift the continuously variable transmission to a predetermined transmission ratio for passing over the level difference upon determining that the level difference is present while traveling by a drive force of the motor with the clutch released and the engine stopped.

6 Claims, 8 Drawing Sheets

(51) Int. Cl.

| | | |
|---|---|---|
| *B60K 6/50* | (2007.10) | |
| *B60K 6/543* | (2007.10) | |
| *B60W 20/30* | (2016.01) | |
| *B60K 6/48* | (2007.10) | |
| *B60T 7/12* | (2006.01) | |
| *B60W 10/02* | (2006.01) | |
| *B60W 10/06* | (2006.01) | |
| *B60W 10/08* | (2006.01) | |
| *B60W 10/10* | (2012.01) | |
| *B60W 10/18* | (2012.01) | |
| *B60W 40/06* | (2012.01) | |
| *B60T 1/10* | (2006.01) | |
| *B60T 13/58* | (2006.01) | |
| *B60L 7/16* | (2006.01) | |
| *B60L 11/14* | (2006.01) | |
| *B60W 20/10* | (2016.01) | |
| *B60W 20/40* | (2016.01) | |
| *B60K 6/387* | (2007.10) | |
| *B60W 10/107* | (2012.01) | |
| *B60W 30/18* | (2012.01) | |
| *B60W 40/076* | (2012.01) | |
| *B60W 20/19* | (2016.01) | |

(52) U.S. Cl.
CPC .......... *B60L 7/16* (2013.01); *B60L 11/14* (2013.01); *B60T 1/10* (2013.01); *B60T 7/12* (2013.01); *B60T 13/586* (2013.01); *B60W 10/02* (2013.01); *B60W 10/06* (2013.01); *B60W 10/08* (2013.01); *B60W 10/10* (2013.01); *B60W 10/107* (2013.01); *B60W 10/18* (2013.01); *B60W 20/10* (2013.01); *B60W 20/19* (2016.01); *B60W 20/40* (2013.01); *B60W 30/18027* (2013.01); *B60W 40/06* (2013.01); *B60W 40/076* (2013.01); *B60K 2006/4808* (2013.01); *B60L 2210/40* (2013.01); *B60L 2240/423* (2013.01); *B60L 2240/443* (2013.01); *B60L 2240/507* (2013.01); *B60W 20/00* (2013.01); *B60W 30/18118* (2013.01); *B60W 30/18127* (2013.01); *B60W 2510/083* (2013.01); *B60W 2510/1005* (2013.01); *B60W 2520/10* (2013.01); *B60W 2530/14* (2013.01); *B60W 2540/10* (2013.01); *B60W 2540/103* (2013.01); *B60W 2550/142* (2013.01); *B60W 2710/021* (2013.01); *B60W 2710/1005* (2013.01); *B60W 2710/18* (2013.01); *B60Y 2300/42* (2013.01); *B60Y 2400/112* (2013.01); *Y10S 903/914* (2013.01); *Y10S 903/918* (2013.01); *Y10S 903/945* (2013.01); *Y10S 903/947* (2013.01)

(58) Field of Classification Search
CPC ...... B60W 20/00; B60W 20/10; B60W 20/40; B60W 40/06; B60K 6/48; B60K 6/543; B60L 7/16; B60L 11/14; B60T 1/10; B60T 7/12; B60T 13/586
See application file for complete search history.

(56) References Cited

U.S. PATENT DOCUMENTS

| | | |
|---|---|---|
| 2014/0046525 A1 | 2/2014 | Lee et al. |
| 2015/0005118 A1* | 1/2015 | Seo .................. B60K 6/543 |
| | | 474/13 |
| 2015/0314775 A1* | 11/2015 | Dextreit ............ B60W 50/0097 |
| | | 701/22 |

FOREIGN PATENT DOCUMENTS

| | | | | |
|---|---|---|---|---|
| EP | 2 014 498 A2 | 1/2009 | | |
| GB | 2 386 879 A | 10/2003 | | |
| GB | 2508670 A | * 6/2014 | ........ | B60W 50/0097 |
| JP | 2000-199442 A | 7/2000 | | |
| JP | 2005-20831 A | 1/2005 | | |
| JP | 2007-278367 A | 10/2007 | | |
| JP | 2013-86649 A | 5/2013 | | |
| JP | 2015-134508 | 7/2015 | | |
| WO | 2012/137278 A1 | 10/2012 | | |
| WO | 2013/146175 A1 | 10/2013 | | |

\* cited by examiner

| | L/B | H/C | R/B |
|---|---|---|---|
| 1ST SPEED | O | × | × |
| 2ND SPEED | × | O | × |
| REVERSE | × | × | O |
| NEUTRAL | × | × | × |

HYBRID VEHICLE CONTROL DEVICE WITH TRANSMISSION CONTROL FOR A LEVEL DIFFERENCE OF A ROAD SURFACE

CROSS-REFERENCE TO RELATED APPLICATIONS

This application is a U.S. National stage application of International Application No. PCT/JP2015/052330, filed Jan. 28, 2015. This application claims right of priority based on Japanese Patent Application No. 2014-057585 filed to the Japan Patent Office on Mar. 20, 2014, and the disclosure of which is hereby entirely incorporated herein by reference.

BACKGROUND

Field of the Invention

The present invention generally relates to a control device for a hybrid vehicle equipped with an engine and an electric motor as power sources, and that is capable of selecting between an electric travel mode (EV mode) for travel executed only by the electric motor and a hybrid travel mode (HEV mode) for travel executed by the electric motor and the engine.

Background Information

For example, a hybrid vehicle such as that disclosed in Japanese Laid-Open Patent Application No. 2000-199442 is known. In this hybrid vehicle, the engine is detachably coupled to a driving wheel sequentially via a continuously variable transmission and a clutch, and an electric motor is constantly coupled to the driving wheel. The hybrid vehicle further comprises a mechanical oil pump that is driven by the engine and that supplies oil to the continuously variable transmission and the clutch.

This hybrid vehicle is capable of electric traveling (EV travel) in the EV mode by only the electric motor by stopping the engine as well as releasing the clutch described above, and is capable of hybrid traveling (HEV travel) in the HEV mode by the electric motor and the engine by starting the engine as well as engaging the clutch.

Since the engine in a stopped state and the continuously variable transmission are disconnected from the drive wheel by releasing the clutch during EV travel, the friction of the engine and the continuously variable transmission can be reduced during EV travel, and by avoiding corresponding energy loss, it is possible to increase the energy efficiency.

SUMMARY

However, in the above-described prior art, after switching from the HEV mode to the EV mode, the rotation of the continuously variable transmission as well as the oil pump will stop as the engine is stopped, preventing a shift control of the continuously variable transmission. As a result, the transmission ratio when switching from the HEV mode to the EV mode remains unchanged. If there is a level difference on the road surface when starting in the EV mode after the vehicle is stopped in this state, there are cases in which the drive force necessary to pass over the level difference is not available in the EV mode. In this case, the mode is switched to the HEV mode by the driver further depressing the accelerator pedal to start the engine. However, if the transmission ratio of the continuously variable transmission has been maintained on the High side as the transmission ratio when previously switching from the HEV mode to the EV mode, even if engine torque is output, the engine torque is reduced by the continuously variable transmission; therefore, it is difficult to transmit the torque required to pass over the level difference to the drive wheel.

In view of the problem described above, an object of the present invention is to provide a hybrid vehicle control device that is capable of climbing over a level difference, even when there is a level difference on the road surface when starting in EV mode.

For this purpose, in the hybrid vehicle control device according to the present invention, when it is determined that a level difference is present when traveling by means of the drive force of the motor with the clutch released and the engine stopped, the engine is restarted while maintaining the released state of the clutch and the continuously variable transmission is downshifted to a predetermined transmission ratio that is capable of passing over the level difference.

That is, when there is a level difference on the road surface when starting in EV mode, the continuously variable transmission is downshifted by the engine to a transmission ratio capable of passing over the level difference; therefore, even if the drive force of the motor is insufficient and the drive force of the engine is used, the engine torque will not be reduced by the continuously variable transmission, and it becomes possible to pass over of the level difference.

BRIEF DESCRIPTION OF THE DRAWINGS

FIG. 2 is a schematic system view illustrating the drive system of the hybrid vehicle and the overall control system thereof in accordance with the first embodiment.

BRIEF DESCRIPTION OF THE DRAWINGS

Figure 1:
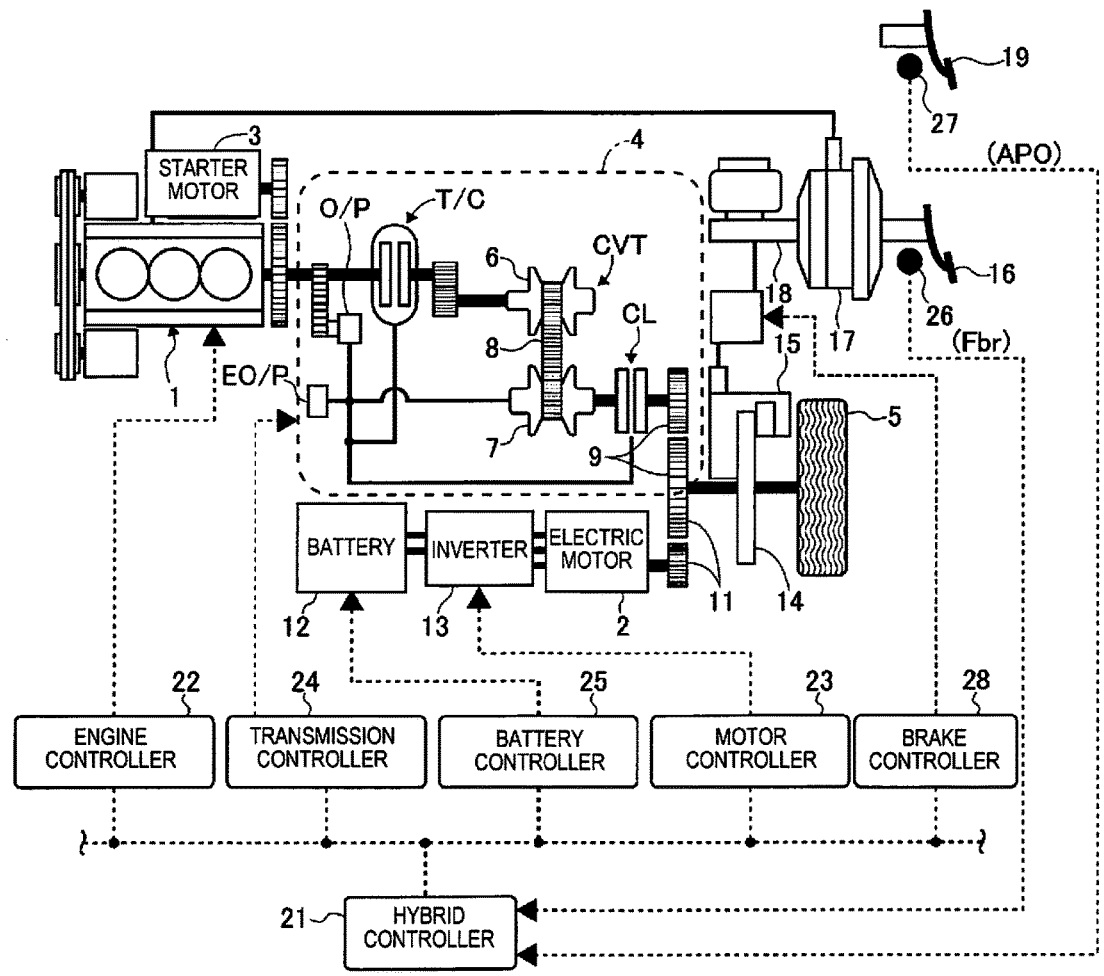
FIG. 1 is a schematic system view illustrating a drive system of a hybrid vehicle and an overall control system thereof in accordance with a first embodiment.

A preferred embodiment for realizing a hybrid vehicle control device of the present invention is described below based on the first embodiment illustrated in the drawings.

First Embodiment

FIG. 1 is a schematic system view illustrating the drive system of the hybrid vehicle and the overall control system thereof of the first embodiment. The hybrid vehicle of FIG.

1 is equipped with an engine 1 and an electric motor 2 as power sources, and the engine 1 is started by a starter motor 3. The engine 1 is drivably coupled to a drive wheel 5 so as to be appropriately detachable via a V-belt type continuously variable transmission 4.

The variator CVT of the continuously variable transmission 4 is a V-belt type continuously variable transmission comprising a primary pulley 6, a secondary pulley 7, and a V-belt 8 (endless flexible member) that is bridged between these pulleys 6, 7. A configuration to bundle a plurality of elements by an endless belt was employed for the V-belt 8, but the configuration is not particularly limited thereto; for example, the chain method or the like may be employed. The primary pulley 6 is coupled to a crankshaft of the engine 1 via a torque converter T/C, and the secondary pulley 7 is sequentially coupled to the drive wheel 5 via a clutch CL and a final gear set 9. In the present embodiment, elements for connecting/disconnecting the power transmission path (clutches, brakes, etc.) are collectively described as the clutch. FIG. 1 conceptually illustrates the power transmission path; the high clutch H/C, the reverse brake R/B, and the low brake L/B provided in the sub-transmission 31 are collectively described as the clutch CL. When the clutch CL is engaged, power from the engine 1 is input to the primary pulley 6 via the torque converter T/C, reaches the drive wheel 5 via the V-belt 8, the secondary pulley 7, the clutch CL, and the final gear set 9 in that order, and is used for running the hybrid vehicle.

During engine power transmission, the winding arc diameter of the V-belt 8 with the primary pulley 6 is increased at the same time that the winding arc diameter with the secondary pulley 7 is decreased by decreasing the pulley V-groove width of the primary pulley 6 and increasing the pulley V-groove width of the secondary pulley 7. The variator CVT thereby performs an upshift to the High-side pulley ratio (High-side transmission ratio). When the upshift to the High-side transmission ratio is carried out to the limit, the transmission ratio is set to the maximum transmission ratio.

Conversely, the winding arc diameter of the V-belt 8 with the primary pulley 6 is decreased at the same time that the winding arc diameter with the secondary pulley 7 is increased by increasing the pulley V-groove width of the primary pulley 6 and decreasing the pulley V-groove width of the secondary pulley 7. The variator CVT thereby performs a downshift to the Low-side pulley ratio (Low-side transmission ratio). When the downshift to the Low-side transmission ratio is carried out to the limit, the transmission ratio is set to the minimum transmission ratio.

The variator CVT comprises a primary rotational speed sensor 6a for detecting the rotational speed of the primary pulley 6, and a secondary rotational speed sensor 7a for detecting the rotational speed of the secondary pulley 7 and calculates the actual transmission ratio on the basis of the rotational speeds detected by these two rotational speed sensors; the hydraulic control, etc., of each pulley is performed so that this actual transmission ratio becomes the target transmission ratio.

An electric motor 2 is constantly coupled to the drive wheel 5 via a final gear set 11, and this electric motor 2 is driven by power from a battery 12 via an inverter 13. The inverter 13 provides power to the electric motor 2 after converting the DC power of the battery 12 to AC power and controls the drive force and the rotational direction of the electric motor 2 by adjusting the power supplied to the electric motor 2. In addition to the motor drive described above, the electric motor 2 also functions as a generator, which is also provided for use in regenerative braking. During this regenerative braking, the inverter 13 causes the electric motor 2 to act as a generator by applying a generator load corresponding to the regenerative braking force to the electric motor 2, and stores the electric power generated by the electric motor 2 in the battery 12.

In the hybrid vehicle of the first embodiment, only the power of the electric motor 2 reaches the drive wheel 5 via the final gear set 11 by driving the electric motor 2 in a state in which the clutch CL is released and the engine 1 is stopped, to carry out traveling in an electric travel mode (EV mode) executed only by the electric motor 2. During this time, friction from the engine 1, which is in a stopped state, and from the variator CVT are reduced, and wasteful power consumption during EV travel is suppressed, by releasing the clutch CL.

In the EV mode travel state described above, if the clutch CL is engaged at the same time as starting the engine 1 with the starter motor 3, the power from the engine 1 will reach the drive wheel 5 via the torque converter T/C, the primary pulley 6, the V-belt 8, the secondary pulley 7, the clutch CL, and the final gear set 9, in that order, and the hybrid vehicle will carry out traveling in a hybrid travel mode (HEV mode) executed by the engine 1 and the electric motor 2.

Stopping the hybrid vehicle from the above-described travel state or maintaining the stopped state is achieved by clamping and braking a brake disk 14, which rotates with the drive wheel 5, with a caliper 15. The caliper 15 is connected to a master cylinder 18 that outputs brake fluid pressure corresponding to the brake pedal stepping force under boost by a negative pressure type brake booster 17, in response to the stepping force of a brake pedal 16 which a driver steps on. Frictional braking of the brake disk 14 is carried out by actuating the caliper 15 with the brake fluid pressure that is generated by the master cylinder 18.

A brake actuator 180 that is capable of adjusting the brake fluid pressure that is supplied to the caliper 15 is provided between the master cylinder 18 and the caliper 15. This brake actuator 180 is configured from a pump motor and a plurality of electromagnetic valves, and increases/decreases the brake fluid pressure that is supplied to the caliper 15. For example, during regenerative braking, even if the master cylinder pressure is increased, the pressure of the caliper 15 is reduced by an amount equivalent to the fluid pressure that corresponds to the regenerative braking force that is generated by the electric motor 2 in order to avoid imparting discomfort to the driver during braking. For example, if a vehicle is stopped on an uphill road or the like, and when restarting thereafter, a hill hold control for supplying brake fluid pressure in order to suppress a backward movement of the vehicle is carried out. During a hill hold control, a control to seal the brake fluid pressure inside the caliper 15 when the driver releases the brake pedal, or a control to secure the necessary braking force by supplying brake fluid to the caliper 15 with a pump motor, is carried out. In both the EV mode and in the HEV mode, the hybrid vehicle drives the wheel 5 by a torque corresponding to a drive force command that is issued by the driver depressing the accelerator pedal 19, and the vehicle travels by a drive force corresponding to the needs of the driver.

The hybrid controller 21 executes a travel mode selection of the hybrid vehicle, the output control of the engine 1, the rotational direction control and the output control of the electric motor 2, the shift control of the variator CVT, the transmission control of the sub-transmission 31, the engagement and disengagement control of the clutch CL, and the charge/discharge control of the battery 12. At this time, the hybrid controller 21 carries out these controls via a corresponding engine controller 22, a motor controller 23, a transmission controller 24, a battery controller 25, and a brake controller 28.

A signal from a brake switch 26, which is a normally-off switch that is switched from OFF to ON when braking by stepping on the brake pedal 16, and a signal from an accelerator pedal opening amount sensor 27, which detects the accelerator pedal depression amount (accelerator pedal opening amount) APO, are input to the hybrid controller 21. The hybrid controller 21 further exchanges internal information among the engine controller 22, the motor controller 23, the transmission controller 24, the battery controller 25, and the brake controller 28.

The engine controller 22 controls the output of the engine 1 in response to a command from the hybrid controller 21, and the motor controller 23 controls the rotational direction and the output of the electric motor 2 via the inverter 13 in response to a command from the hybrid controller 21. The transmission controller 24 carries out transmission control of the variator CVT (V-belt type continuously variable transmission CVT), the transmission control of the sub-transmission 31, and the engagement/disengagement of the clutch CL, with oil from an engine-driven mechanical oil pump O/P (or an electric oil pump EO/P that is driven by a pump motor) as a medium, in response to a command from the hybrid controller 21. The battery controller 25 controls the charging/discharging of the battery 12 in response to a command from the hybrid controller 21. In addition to carrying out a cooperative control of the braking force by the fluid pressure and the regenerative braking force, the brake controller 28 carries out a hill hold control in response to a command from the hybrid controller 21.

Figures 2A, 2B:
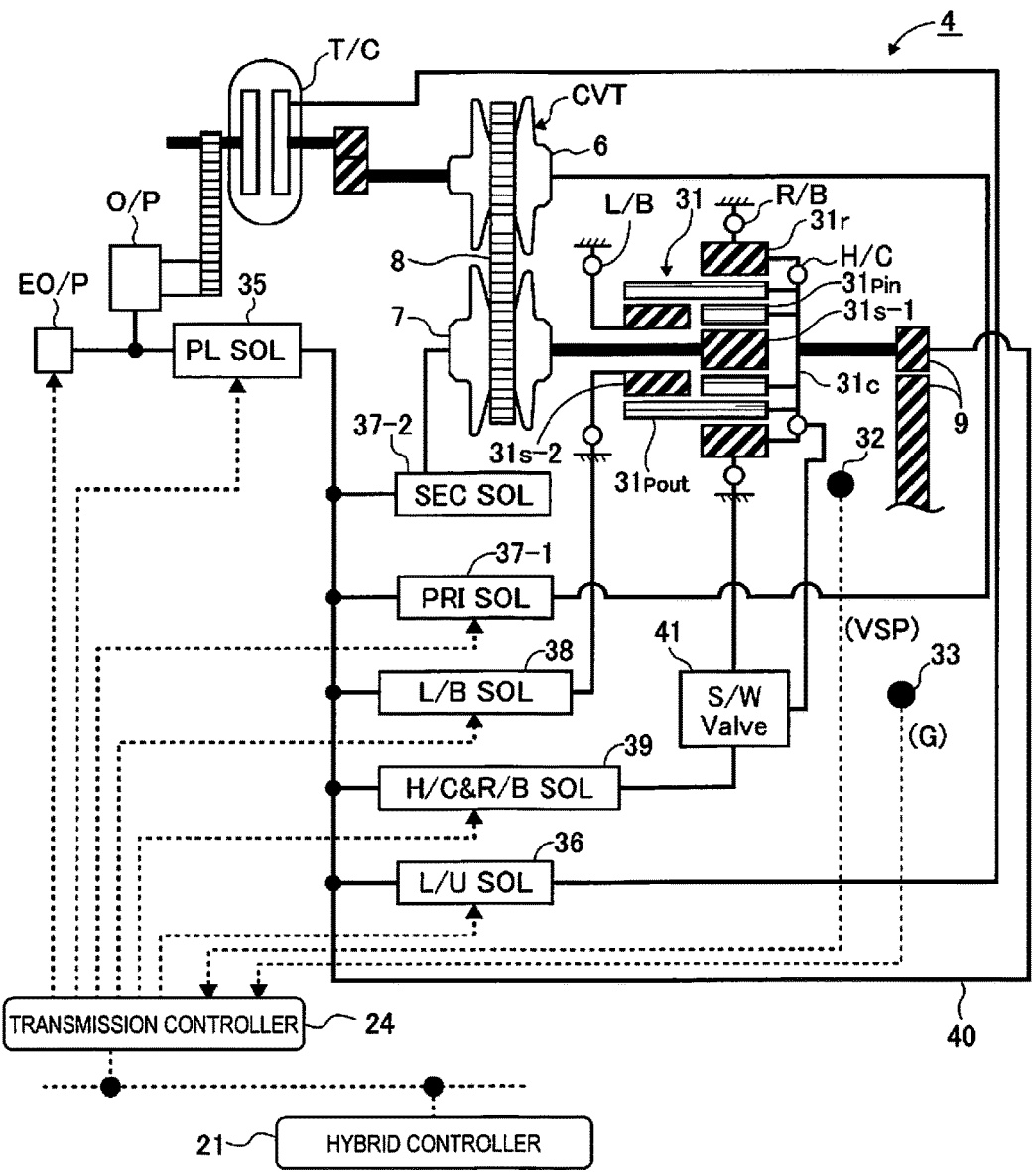
FIG. 2B is a clutch engagement logic diagram in a sub-transmission that is built into a V-belt type continuously variable transmission in a drive system of the hybrid vehicle in accordance with the first embodiment.

FIG. 2A is a schematic system view illustrating the drive system of the hybrid vehicle of the first embodiment and the overall control system thereof. FIG. 2B is the clutch CL (specifically, H/C, R/B, L/B) engagement logic diagram in a sub-transmission 31 that is built into a continuously variable transmission 4 in a drive system of the hybrid vehicle. The sub-transmission 31 is configured from a Ravigneaux planetary gear set, comprising compound sun gears 31s-1 and 31s-2, an inner pinion 31pin, an outer pinion 31pout, a ring gear 31r, and a carrier 31c that rotatably supports the pinions 31pin, 31pout, as illustrated in FIG. 2A.

Of the compound sun gears 31s-1 and 31s-2, the sun gear 31s-1 is coupled to the secondary pulley 7 so as to act as an input rotation member, and the sun gear 31s-2 is disposed coaxially with respect to the secondary pulley 7 so as to be freely rotatable.

The inner pinion 31pin meshes with the sun gear 31s-1, and this inner pinion 31pin and the sun gear 31s-2 each mesh with the outer pinion 31pout. The outer pinion 31pout meshes with the inner perimeter of the ring gear 31r, then couples with the final gear set 9 so as to cause the carrier 31c to act as an output rotation member. The carrier 31c and the ring gear 31r are configured to be appropriately connectable by the high clutch H/C, which is the clutch CL; the ring gear 31r is configured to be appropriately connectable by the reverse brake RIB, which is the clutch CL; and the sun gear 31s-2 is configured to be appropriately connectable by the low brake L/B, which is the clutch CL.

The sub-transmission 31 is capable of selecting the gear shift stages of forward first speed, second speed, and reverse by engaging the high clutch H/C, the reverse brake R/B, and the low brake L/B in a combination illustrated by the ○ mark in FIG. 2(b) and releasing the others as illustrated by the x mark in FIG. 2(b). If the high clutch H/C, the reverse brake R/B, and the low brake L/B are all released, the sub-transmission 31 is in a neutral state that does not carry out power transmission. If the low brake L/B is engaged in this state, the sub-transmission 31 will be placed in a forward first speed selected (deceleration) state. If the high clutch H/C is engaged, the sub-transmission 31 will be in a forward second speed selected (direct connection) state; and if the reverse brake R/B is engaged, the sub-transmission 31 will be in a reverse selected (reverse) state.

The continuously variable transmission 4 in FIG. 2(a) is capable of detaching the variator CVT (secondary pulley 7) and the drive wheel 5 by releasing all of the clutches CL (H/C, R/B, L/B) to put the sub-transmission 31 in the neutral state.

The continuously variable transmission 4 in FIG. 2(a) is controlled with oil from an engine driven mechanical oil pump O/P or an electric oil pump EO/P that is driven by a pump motor as a working medium; the transmission controller 24 controls the transmission control of the variator CVT in the following manner via a line pressure solenoid 35, a lock-up solenoid 36, a primary pulley pressure solenoid 37-1, a secondary pulley pressure solenoid 37-2, a low brake pressure solenoid 38, a high clutch pressure and reverse brake pressure solenoid 39, and a switch valve 41. In addition to the signals described above for FIG. 1, a signal from a vehicle speed sensor 32 that detects the vehicle speed VSP and a signal from an acceleration sensor 33 that detects the vehicle acceleration/deceleration G are input into the transmission controller 24.

The line pressure solenoid 35 regulates the pressure of the oil from the mechanical oil pump O/P to a line pressure PL, which corresponds to the required drive force of the vehicle, in response to a command from the transmission controller 24. Additionally, an electric oil pump EO/P is connected between the mechanical oil pump O/P and the line pressure solenoid 35, which supplies a pump discharge pressure in response to a command from the transmission controller 24.

The lock-up solenoid 36 places the torque converter T/C in a lock-up state in which the input/output elements are directly connected when required, by appropriately directing the line pressure PL to the torque converter T/C, in response to a lock-up command from the transmission controller 24.

The primary pulley pressure solenoid 37-1 regulates the line pressure PL to the primary pulley pressure in response to a CVT transmission ratio command from the transmission controller 24 and supplies same to the primary pulley 6, thereby fulfilling the CVT transmission ratio command from the transmission controller 24 by controlling the V-groove width of the primary pulley 6 and the V-groove width of the secondary pulley 7 so that the CVT transmission ratio matches the command from the transmission controller 24. The secondary pulley pressure solenoid 37-2 regulates the line pressure PL to the secondary pulley pressure in response to a clamping force command from the transmission controller 24 and supplies the same to the secondary pulley 7; the secondary pulley thereby clamps the V-belt 8 to prevent slipping. When the transmission controller 24 is emitting a first speed selection command of the sub-transmission 31, the low brake pressure solenoid 38 supplies the line pressure PL to the low brake L/B as the low brake pressure and engages the same in order to realize the first speed selection command. When the transmission controller 24 is emitting a second speed selection command or the reverse selection command of the sub-transmission 31, the high clutch pressure and reverse brake pressure solenoid 39 supplies the line pressure PL to the switch valve 41 as the high clutch pressure and reverse brake pressure.

The maximum discharge capacity of the electric oil pump EO/P of the first embodiment is set to be smaller than that of the mechanical oil pump O/P in order to realize a downsizing of the motor and the pump of the electric oil pump EO/P.

At the time of the second speed selection command, the second speed selection command of the sub-transmission 31 is realized with the switch valve 41 directing the line pressure PL from the solenoid 39 to the high clutch H/C as the high clutch pressure and engaging the same. At the time of the reverse selection command, the reverse selection command of the sub-transmission 31 is realized with the switch valve 41 directing the line pressure PL from the solenoid 39 to the reverse brake R/B as the reverse brake pressure and engaging the same.

The transmission control process will now be explained. The transmission controller 24 controls the continuously variable transmission 4 according to the travel state of the vehicle (the vehicle speed VSP, a primary rotational speed Npri, and the accelerator pedal opening amount APO in the first embodiment) with reference to this shift map. A shift line is set for each accelerator pedal opening amount APO in this shift map, in the same way as a shift map for a conventional belt type continuously variable transmission, and shifting of the continuously variable transmission 4 is carried out according to the shift line selected according to the accelerator pedal opening amount APO. A mode switching shift line for the shifting of the sub-transmission 31 is set on this shift map. Then, when the operating point of the continuously variable transmission 4 crosses the mode switching shift line, the transmission controller 24 carries out a coordinated shift with both the variator CVT and the sub-transmission 31 to switch between high speed mode-low speed mode. At low vehicle speeds, such as during starting, the sub-transmission 31 carries out a transmission control mainly by controlling the pulley ratio of the variator CVT, in a state in which the forward first speed is selected.

Figure 3:
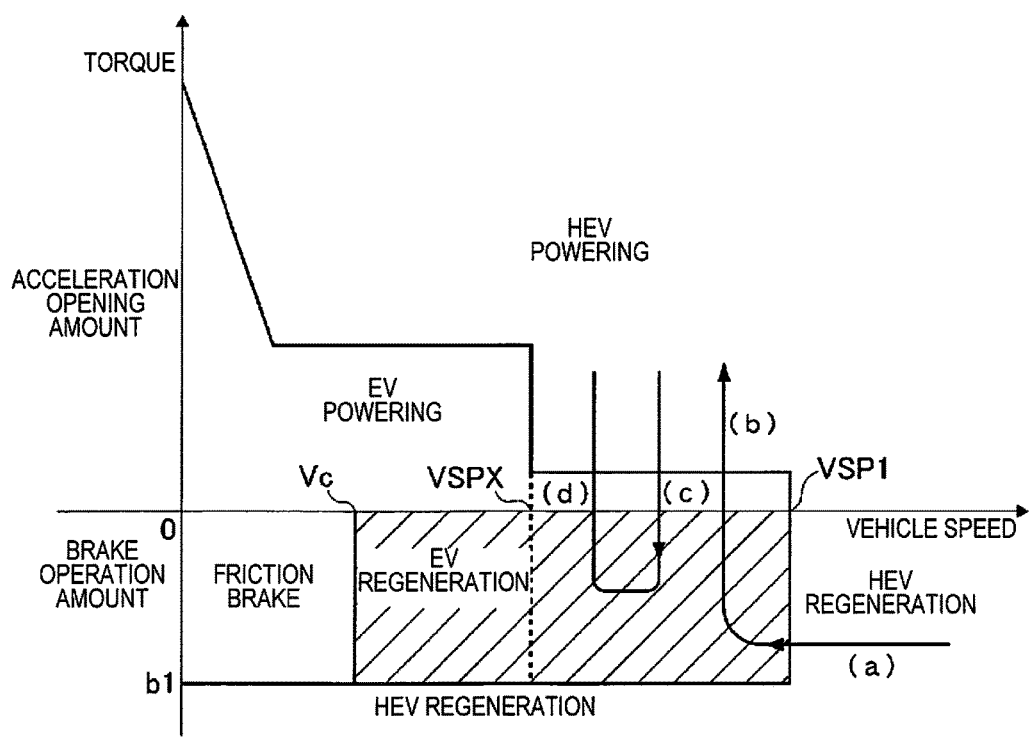
FIG. 3 is a mode map in which are set the travel modes of the hybrid vehicle of the first embodiment.

FIG. 3 is a mode map in which are set the travel modes of the hybrid vehicle of the first embodiment. In the mode map of FIG. 3, the travel mode is set according to the accelerator pedal opening amount when above 0 of the vertical axis, and set according to the ON/OFF state of the brake switch 26 when below 0. In the EV power region in which the accelerator pedal 19 is depressed, a power region is set by the EV mode up to the powering vehicle speed VSPX. In addition, in a region representing a state in which the accelerator pedal 19 is slightly depressed (for example, an accelerator pedal opening amount that is somewhat less than ⅛), a powering region is set by the EV mode up to a predetermined vehicle speed VSP1, which is a higher vehicle speed than the powering vehicle speed VSPX. A region that is less than or equal to this predetermined vehicle speed VSP1 is almost never selected in a state in which the accelerator pedal 19 is depressed.

On the other hand, when the accelerator pedal 19 is released during travel by the HEV mode to transition to coasting (inertial) traveling, or when the brake pedal 16 is depressed from a powering state by the HEV mode to brake the vehicle, improved energy efficiency is realized by converting the kinetic energy of the vehicle to electric power with regenerative braking by the electric motor 2, and storing the electrical power in the battery 12 (HEV regeneration state). Additionally, when the braking torque is higher than a predetermined value b1, it is determined that there would be insufficient braking force with regenerative braking by only the electric motor 2, and the vehicle is placed in the HEV regeneration state. Frictional braking is thereby used in combination to secure the braking torque. Even if the braking torque is less than the predetermined value b1, if the vehicle speed is less than or equal to a predetermined vehicle speed Vc, it is switched from the EV regeneration state to frictional braking. This is because it is undesirable to generate a high regenerative torque when the electric motor 2 has a low rotational speed.

When performing regenerative braking while in the HEV mode (HEV regeneration state), since the clutch CL is in an engaged state, the regenerative braking energy is reduced by the amount of the reverse drive force of the engine 1 (engine braking) and the amount of the friction of the continuously variable transmission 4, so that the energy regeneration efficiency is poor. Accordingly, regenerative braking is started during travel in the HEV mode, and when the vehicle speed falls below the predetermined vehicle speed VSP1, the engine 1 and the variator CVT are detached from the drive wheel 5 by releasing the clutch CL to transition to a traveling by the EV mode. The vehicle is thereby placed in an EV regeneration state, and the friction from the engine 1 and the continuously variable transmission 4 is reduced so that a corresponding amount of energy regeneration can be gained. Additionally, during travel in the EV mode, from the standpoint of fuel efficiency, the engine 1 is stopped by preventing the restarting of the injection of fuel to the engine 1 (fuel recovery), so that the cessation of the injection of fuel to the engine 1 which was executed during coasting travel (fuel cutting) is continued even after release of the clutch CL.

Transmission control when transitioning from HEV mode to EV mode will now be described. For example, as illustrated by the arrow (a) described in the mode map in FIG. 3, when decelerating by operating the brake from the HEV regeneration region and entering the EV regeneration region to enter the EV regeneration state, the clutch CL is released and the engine 1 is stopped. Then, as illustrated by the arrow (b) in FIG. 3, when the required drive force becomes greater than or equal to a prescribed force by depressing the accelerator pedal 19, the process transitions to the HEV powering region. In the same manner, for example, as illustrated by the arrow (c) in FIG. 3, when entering the EV regeneration region to become in the EV regeneration state by operating the brake from the HEV powering region in which the accelerator pedal 19 is depressed, the clutch CL is released and the engine 1 is stopped. Then, as illustrated by the arrow (d) in FIG. 3, when the required driving force becomes greater than or equal to a prescribed force by depression of the accelerator pedal 19, the process transitions to the HEV powering region. At this time, the engine 1 is restarted with the starter motor 3 and the clutch CL is engaged to switch from the EV mode to the HEV mode.

In this manner, when the vehicle is being driven by a driver with the habit of frequently releasing and depressing the accelerator pedal 19, when the vehicle is used in a travel environment in which such driving is necessary, or when in a state in which the brake pedal 16 is depressed, the brake is released before the vehicle stops and the accelerator pedal 19 is depressed again (hereinafter referred to as change of mind), a switching from the EV mode to the HEV mode is necessarily carried out.

At this time, it is also conceivable to shift to the Lowest transmission ratio. However, when switching from the EV mode to the HEV mode at a relatively high vehicle speed due to a change of mind, the engine rotation speed must be increased to an extremely high level in order to achieve synchronization with the rotational speed of the drive wheel, and the engine rotation speed will over-rev (mechanical upper limit value of the rotational speed) depending on the vehicle speed; therefore, the only state that can be obtained is one in which the input side rotational frequency (secondary rotational speed) is lower than the output side rotational frequency (drive wheel rotational speed) of the clutch CL. If the clutch CL is engaged at once in this state, drag shock occurs even though an acceleration request is being output, imparting discomfort to the driver. In order to prevent this discomfort, it is necessary to engage the clutch CL after achieving a synchronous rotation using both the engine 1 and the continuously variable transmission 4, which requires time to switch to the HEV mode; therefore, there is the risk that the responsiveness with respect to the acceleration request of the driver deteriorates.

When in EV mode, the mode can be switched quickly if the transmission ratio of the variator CVT is constantly shifted according to the shift map, regardless of the timing at which the switching from the EV mode to the HEV mode occurs, since a relative rotation is not generated in the clutch CL. However, forcibly shifting the variator CVT in a non-rotating state requires an output that is extremely high as an output of the electric oil pump EO/P, so that there is the risk of lessening the ability to mount the latter to the vehicle, which accompanies an increase in the size of same in addition to an increase in energy consumption. In addition, when maintaining the transmission ratio by rotating the variator CVT to some extent, it is necessary to engage (including slip engagement) the clutch CL, which leads to deterioration of fuel consumption that accompanies an increase in friction. Therefore, in the first embodiment, when a request is made to switch to the EV mode (EV regeneration state) during deceleration by the HEV mode, the transmission ratio of the continuously variable transmission 4 at that point in time is maintained in an as-is state.

A problem that occurs when the vehicle is stopped while in EV mode, after transitioning from the HEV mode to the EV mode, will now be described. Basically, since the mode has transitioned from the HEV mode to the EV mode in the travel state before stopping, a scenario is assumed in which the transmission ratio of the variator CVT is a transmission ratio on the Higher side of the Lowest transmission ratio. Thereafter, when the driver makes an acceleration request by depressing the accelerator pedal 19, the vehicle will start in EV mode when the accelerator depression amount by the driver is small, and start in HEV mode when the accelerator depression amount is large. Starting in HEV mode means that HEV mode on the mode map has been selected and not that the engine 1 has actually been started.

Described next is a case in which the depression amount of the accelerator pedal is small to start in EV mode. If there is a level difference on the road surface after starting, it is possible to pass over the level difference if the torque of the electric motor 2 exceeds the torque necessary to pass over the level difference. However, it is not possible to pass over the level difference if the torque of the electric motor 2 is less than the torque necessary to pass over the level difference, or if the electric motor 2 outputs the maximum torque that can be output but the maximum torque is lower than the torque necessary to pass over the level difference.

Here, if the driver desires to pass over the level difference, the driver further depresses the accelerator pedal to transition to the HEV mode; the engine 1 is thereby restarted, the clutch CL is engaged, and the engine torque is applied to the drive wheel 5. However, even if engine torque is output, if the transmission ratio of the variator CVT is maintained on the High side, the engine torque is transmitted to the drive wheel 5 in a decreased state; therefore, it is difficult to transmit the torque required to pass over the level difference to the drive wheel 5.

Therefore, in the first embodiment, the presence/absence of a level difference is determined after starting in EV mode. If there is a level difference, the transmission ratio of the variator CVT is downshifted to a predetermined transmission ratio G1 with which it is possible to pass over the level difference. Here, the predetermined transmission ratio G1 with which it is possible to pass over the level difference may be the "Lowest transmission ratio," or a "transmission ratio in the vicinity of the Lowest, which is on the Higher side of the Lowest transmission ratio but with which it is possible to clear the most extreme level difference condition that may exist on an ordinary road."

Figure 4:
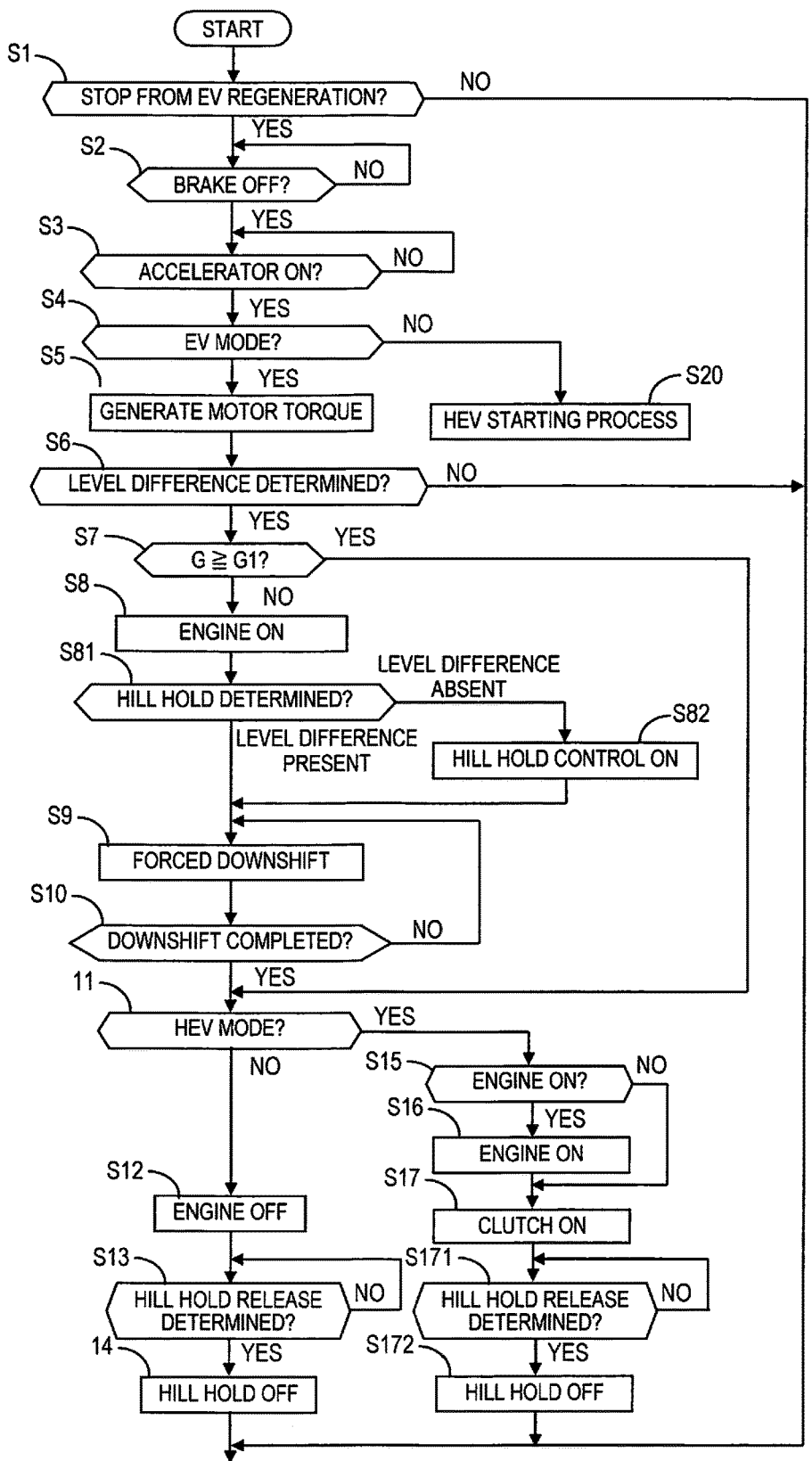
FIG. 4 is a flowchart illustrating a forced downshift control process accompanying a level difference determination in the first embodiment.
Figure 5:
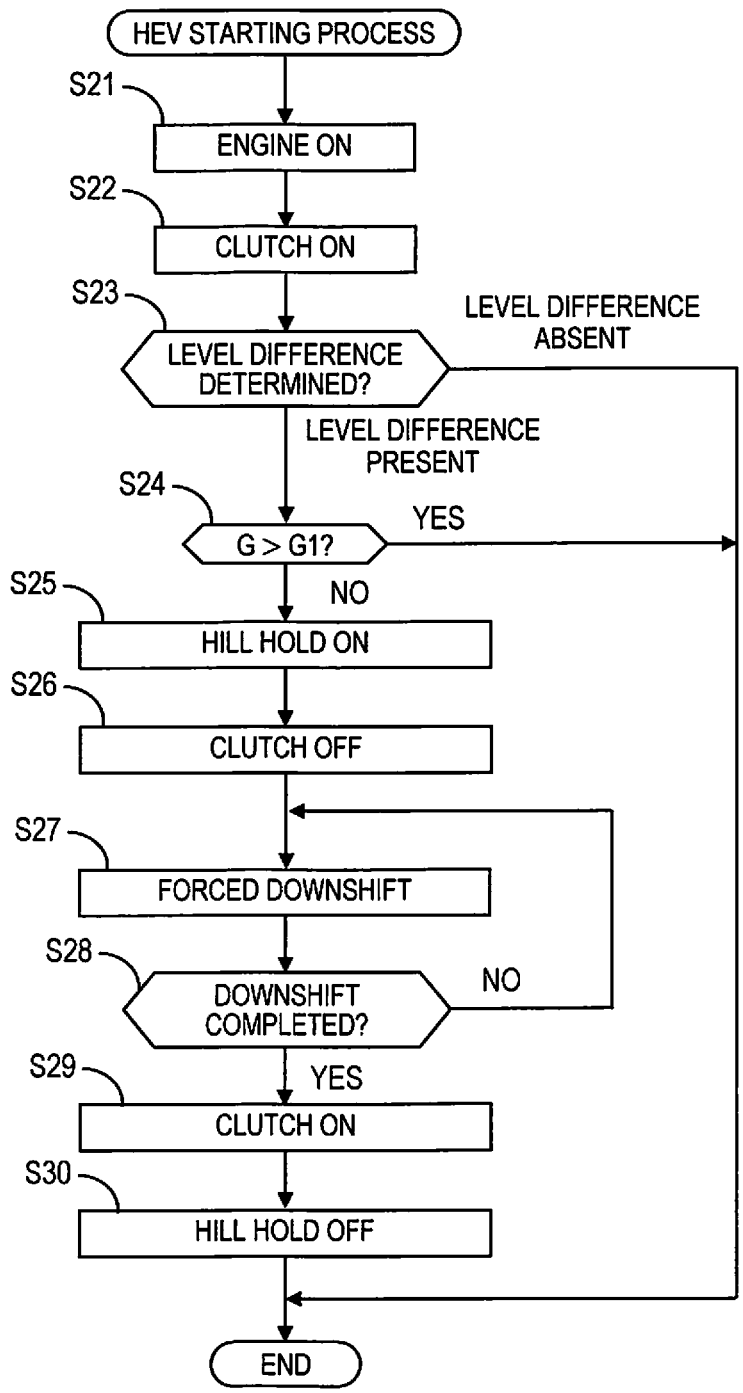
FIG. 5 is a flowchart illustrating a forced downshift control process accompanying a level difference determination in the first embodiment.

FIGS. 4 and 5 are flowcharts illustrating a forced downshift control process accompanying a level difference determination in the first embodiment. In Step S1, it is determined whether or not the vehicle was stopped from a regenerative braking state while in EV mode (hereinafter referred to as EV regeneration state). If the vehicle has stopped from an EV regeneration state, the process proceeds to Step S2. Otherwise, the present set of control steps is ended. This is because, in the case of a vehicle stop from an EV regeneration state, there is a possibility that the transmission ratio of the variator CVT is on the Higher side than the Lowest transmission ratio, and in all other cases of a vehicle stop, a downshift has occurred to the Lowest transmission ratio.

In Step S2, it is determined whether or not the brake pedal is released and the brake switch 26 is OFF. If the brake switch 26 is OFF, the process proceeds to Step S3. Otherwise, the present step is repeated. This is because if the brake switch 26 is OFF, the probability of a start is high.

In Step S3, it is determined whether or not the accelerator pedal has been depressed, that is, whether or not the accelerator pedal opening amount APO is greater than or equal to a predetermined opening amount that indicates an intention to start. If greater than or equal to the predetermined opening amount, it is determined that there is an intention to start and the process proceeds to Step S4. Otherwise, the present step is repeated.

In Step S4, it is determined whether or not the present travel mode is the EV mode from the mode map; in the case of an EV mode, the process proceeds to Step S5. Otherwise, the process proceeds to Step S20 to execute an HEV starting process.

In Step S5, motor torque corresponding to the accelerator pedal opening amount APO of the driver is output from the electric motor 2.

In Step S6, a level difference determination is carried out. If it is determined that a level difference is present, the process proceeds to Step S7, and if it is determined that a level difference is absent, the present set of control steps is ended and travel in EV mode is continued. In the level difference determination, it is determined that a level difference is present if the accelerator pedal opening amount APO is greater than or equal to a predetermined value that indicates an intention of the driver to pass over a level difference, or if the motor torque is greater than or equal to a predetermined torque and the vehicle speed is less than a predetermined vehicle speed that indicates a vehicle stopped state. This is because it can be assumed that a forward movement of the vehicle is being hindered by a level difference in a scenario in which the driver is depressing the accelerator pedal to indicate an intent to travel but the vehicle speed is not increasing, even though the motor torque is outputting torque that is greater than or equal to a predetermined torque required for travel.

In Step S7, it is determined whether or not the current transmission ratio G of the variator CVT is greater than or equal to the transmission ratio G1 with which it is possible to pass over the level difference (Low-side). If on the Low-side, it is determined that the transmission ratio G of the variator CVT is already in a state in which sufficient torque can be output, and the process proceeds to Step S11 to prevent a forced downshift to thereby avoid an unnecessary engine start or the like. On the other hand, if on the High side, it is determined that the variator CVT must be forcibly downshifted toward the transmission ratio G1 with which it is possible to pass over the level difference, and the process proceeds to Step S8. The detection of the transmission ratio is not particularly limited; for example, the transmission ratio at the time of the previous transition from HEV mode to EV mode may be stored in a memory or the like, and a determination can be made using the stored transmission ratio, or if a sensor that is capable of detecting the groove width of the variator CVT is provided, the transmission ratio may be detected on the basis of the groove width.

In Step S8, the engine is restarted (hereinafter referred to as engine ON) by the starter motor 3.

In Step S81, a hill hold determination is carried out. If it is determined that a hill hold control is necessary, the process proceeds to Step S82 to turn ON a hill hold control; and if it is determined not to be necessary, the process proceeds to Step S9. That is, if the driver is depressing the brake pedal after contacting a level difference and the vehicle is stopped, a hill hold control is not carried out since the vehicle does not move. On the other hand, if the driver is not depressing the brake pedal, a hill hold control is turned ON to regulate the movement of the vehicle, and to regulate the movement of the vehicle by friction brakes.

In Step S9, a state in which the variator CVT is rotated by the engine 1 is ensured, and the variator CVT is forcibly downshifted toward the transmission ratio G1 with which it is possible to pass over the level difference (hereinafter referred to as a forced downshift), with the oil pump O/P that is driven by the engine 1 as the hydraulic power source.

In Step S10, it is determined whether or not the transmission ratio has reached the transmission ratio G1 with which it is possible to pass over the level difference. If reached, the process proceeds to Step S11; and if not reached, the process returns to Step S9 to continue the forced downshift.

In Step S11, it is determined whether or not the mode has transitioned to the HEV mode due to a depression of the accelerator pedal by the driver. If in HEV mode, the process proceeds to Step S15; and if EV mode is being continued, the process proceeds to Step S12 and the engine 1 which was started in Step S8 is turned OFF.

In Step S13, it is determined whether or not the hill hold control is ON. If the motor torque of the electric motor 2 is greater than or equal to a predetermined value, the process proceeds to Step S14 and the hill hold control is turned OFF; and if less than the predetermined value, the hill hold control is continued to maintain the vehicle stop.

If the driver has not increased the accelerator pedal depression amount from the time of contacting the level difference, the vehicle cannot pass over the level difference, placing the vehicle in a continuously stopped state. Additionally, as illustrated in the mode map of FIG. 3, when the vehicle speed is in the vicinity of 0 km/h, the EV mode region is expanded in the axial direction of the accelerator position opening amount; therefore, if the accelerator pedal is depressed within this EV mode region and the torque required for passing over the level difference is secured, it is possible to pass over the level difference and travel while maintaining the EV mode.

In Step S15, it is determined whether or not the engine 1 is ON. If the engine is ON as a result of a forced downshift, the process proceeds to Step S17; and if a forced downshift has not been carried out and the engine is not ON, the process proceeds to Step S16 to turn the engine 1 ON.

In Step S17, the clutch CL is turned ON to travel in HEV mode.

In Step S171, it is determined whether or not the hill hold control is ON. If the motor torque of the electric motor 2 is greater than or equal to a predetermined value and the transmission torque capacity of the clutch CL is greater than or equal to a predetermined value, there is no risk of the vehicle moving backward; therefore, the process proceeds to Step S172 and the hill hold control is turned OFF; and if either of the conditions is not met, the hill hold control is continued to maintain the vehicle stop.

FIG. 5 is a flowchart illustrating the HEV starting process of the first embodiment.

In Step S21, the engine 1 is turned ON.

In Step S22, the clutch CL is turned ON.

In Step S23, a level difference determination is carried out. If it is determined that a level difference is present, the process proceeds to Step S24; and if it is determined that a level difference is absent, the present set of control steps is ended and travel in HEV mode is continued unchanged. Here, in the level difference determination, it is determined that a level difference is present if the accelerator pedal opening amount APO is greater than or equal to a predetermined value that indicates an intent of the driver to pass over a level difference, the engine torque is greater than or equal to a predetermined torque, the motor torque is greater than or equal to a predetermined torque, and the vehicle speed is less than a predetermined vehicle speed that indicates a vehicle stopped state. This is because it can be assumed that a forward movement of the vehicle is being prevented by a level difference in a scenario in which the driver is depressing the accelerator pedal to indicate an intent to travel but the vehicle speed is not increasing, even though the engine torque and the motor torque are outputting torque that is greater than or equal to a predetermined torque required for travel. In the level difference determination in Step S6, the condition for the determination is that one of an accelerator pedal opening amount condition and a motor torque condition is satisfied. This is because the accelerator pedal opening amount and the motor torque are correlated when in EV mode. On the other hand, in HEV mode, it is conceivable that the motor torque is outputting a regenerative torque in a power generation mode. In this case, since the motor torque has the capacity to output the drive torque even without specifically carrying out a downshift, the condition for the determination is that both the accelerator pedal opening amount condition and the motor torque condition are satisfied.

In Step S24, it is determined whether or not the current transmission ratio G of the variator CVT is greater than or equal to the transmission ratio G1 with which it is possible to pass over the level difference (Low-side). If on the Low-side, it is determined that the transmission ratio G of the variator CVT is already in a state in which sufficient torque can be output, and the present set of control steps is ended to prohibit the forced downshift. On the other hand, if on the High side, it is determined that the variator CVT must be forcibly downshifted toward the transmission ratio G1 with which it is possible to pass over the level difference, and the process proceeds to Step S25.

In Step S25, the hill hold control is turned ON. Specifically, brake fluid is supplied to the caliper 15 by a brake actuator 180 to prevent the rolling of the tires that include the drive wheel 5 and/or the driven wheel. That is, a case is assumed in which, upon contacting a level difference, the tires are slightly riding on the level difference and the vehicle is stopped immediately before passing over. At this time, if the clutch CL is temporarily turned OFF after the next Step S26, there is the risk that the engine torque cannot be transmitted and that the vehicle will be pushed back and continue to move. Therefore, the movement of the vehicle is suppressed by turning the hill hold control ON and regulating the rotation of the tires.

In Step S26, the clutch CL is turned OFF. That is, it is necessary to rotate the variator CVT in order to forcibly downshift the variator CVT. In a state in which the clutch CL is engaged in a vehicle stop state, the variator CVT cannot be rotated and be downshifted; therefore, the clutch CL is temporarily released to place the variator CVT in a rotatable state.

In Step S27, a forced downshift is executed. When carrying out a forced downshift during the HEV mode in this manner, since a load is not input from the drive wheel 5 side to the variator CVT, it is possible to quickly downshift the transmission ratio of the variator CVT to the transmission ratio G1 with which it is possible to pass over the level difference. A forced downshift is carried out after the level difference determination. In other words, a forced downshift is not particularly carried out if a level difference is not present; therefore, the impact on drivability is minimized by suppressing unnecessary downshifting to a minimum.

In Step S28, it is determined whether or not the transmission ratio has reached the transmission ratio G1 with which it is possible to pass over the level difference. If reached, the process proceeds to Step S29; and if not reached, the process returns to Step S27 to continue the forced downshift.

In Step S29, the clutch CL is turned ON.

In Step S30, the hill hold control is turned OFF to travel in HEV mode. At this time, since the downshift of the variator CVT has been completed, the drive torque necessary to pass over the level difference is ensured, and it is possible to pass over the level difference without a backward movement of the vehicle.

Figure 6:
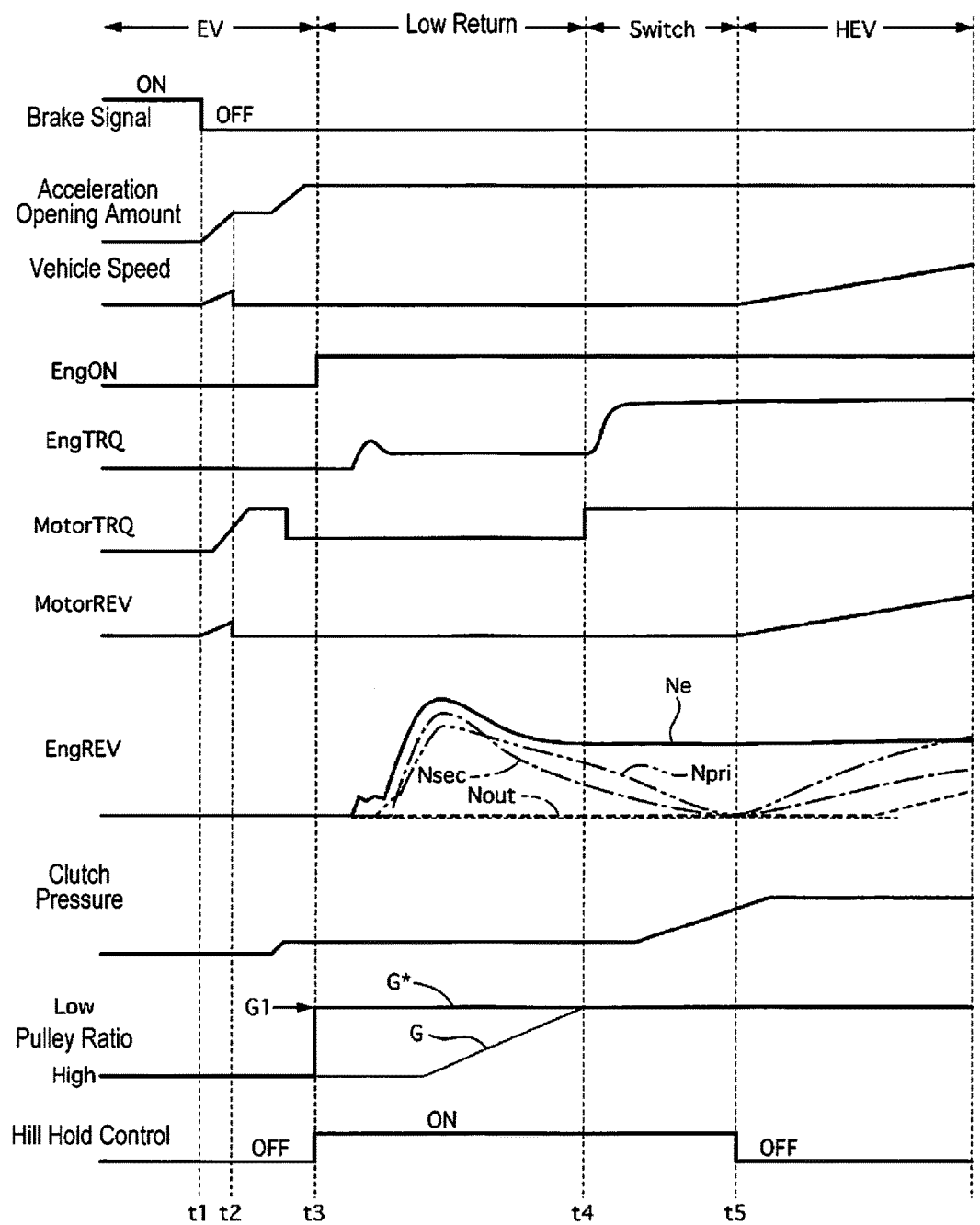
FIG. 6 is a flowchart illustrating a state in which the accelerator pedal is depressed after a level difference determination to start in HEV mode in the hybrid vehicle of the first embodiment.

FIG. 6 is a time chart illustrating a state in which the accelerator pedal is depressed after a level difference determination to start in the HEV mode in the hybrid vehicle of the first embodiment. At time t1, the driver releases the brake pedal and the brake switch 26 is switched from ON to OFF, after which the driver steps on the accelerator pedal to begin starting. At time t2, since the vehicle contacts a level difference and cannot move forward, the increase in the vehicle speed is stopped, and the motor rotation speed MotorREV is also stopped. However, since the driver is still in a state of depressing the accelerator pedal, the motor torque MotorTRQ continues to increase. At this time, since the motor torque MotorTRQ is greater than or equal to a predetermined value that indicates an intent to pass over the level difference and the vehicle speed is less than the predetermined vehicle speed that indicates a vehicle stop state, it is determined that a level difference is present. At this time, it is determined that even if the current motor torque MotorTRQ is continued to be output, the level difference cannot be passed over; therefore, the motor torque MotorTRQ is temporarily suppressed to reduce the load to the motor drive circuit, as well as to suppress unnecessary battery consumption. As described below, since the hill hold control is also turned ON, it is possible to prevent the vehicle from moving backward. Additionally, it is determined that there is a high probability that a transition to the HEV mode will be carried out; therefore, a transmission torque capacity for eliminating backlash is set for the clutch CL in order to secure a state in which it is possible immediately to generate torque transmission capacity when an engagement request of the clutch CL is received. After contacting the level difference, the driver further depresses the accelerator pedal, thereby making a transition request from EV mode to HEV mode.

At time t3, a forced downshift is executed before the mode transition to HEV mode. Specifically, the engine 1 is turned ON, and the target transmission ratio G* of the variator CVT is set to the transmission ratio G1 with which it is possible to pass over the level difference. Then, if the engine rotation speed is increased, the variator CVT starts downshifting. At time t4, when the transmission ratio G of the variator CVT reaches the transmission ratio G1 with which it is possible to pass over the level difference, the transition from EV mode to HEV mode is started in order to recover the motor torque MotorTRQ that had been suppressed and to increase the engine torque EngTRQ. At this time, since the variator CVT has sufficiently downshifted, it is possible to increase the engine torque EngTRQ and to transmit same to the drive wheel 5. Additionally, the transmission torque capacity of the clutch CL is gradually increased, which is accompanied by the primary rotational frequency Npri and the secondary rotational frequency Nsec of the variator CVT approaching the drive wheel rotational speed Nout. At time t5, when the transmission torque capacity of the clutch CL becomes greater than or equal to the torque required to pass over the level difference, the hill hold control is turned OFF, and the vehicle passes over the level difference and starts.

Figure 7:
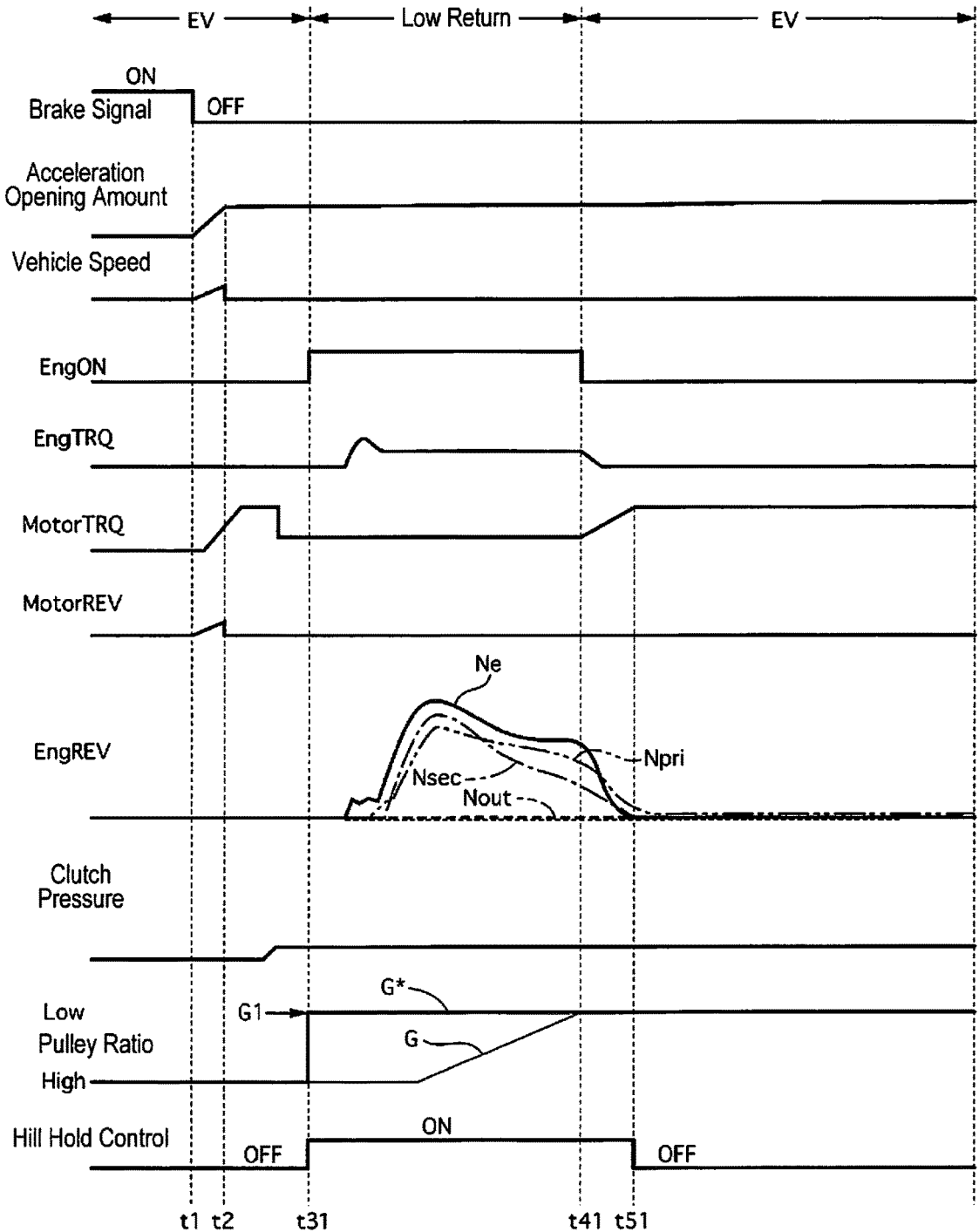
FIG. 7 is a time chart illustrating a state in which the accelerator pedal is maintained after a level difference determination to maintain the EV mode in the hybrid vehicle of the first embodiment.

FIG. 7 is a time chart illustrating a state in which the accelerator pedal is maintained after a level difference determination to maintain the EV mode in the hybrid vehicle of the first embodiment. At time t1, the driver releases the brake pedal and the brake switch 26 is switched from ON to OFF, after which the driver steps on the accelerator pedal to begin starting.

At time t2, since the vehicle contacts a level difference and cannot move forward, the increase in the vehicle speed is stopped and the motor rotation speed MotorREV is also stopped. However, since the driver is still in a state of depressing the accelerator pedal, the motor torque MotorTRQ continues to increase. At this time, since the motor torque MotorTRQ is greater than or equal to a predetermined value that indicates an intent to pass over the level difference and the vehicle speed is less than the predetermined vehicle speed that indicates a vehicle stop state, it is determined that a level difference is present. At this time, it is determined that even if the current motor torque MotorTRQ is continued to be output, the level difference cannot be passed over; therefore, the motor torque MotorTRQ is temporarily suppressed to reduce the load on the motor drive circuit, as well as to suppress unnecessary battery consumption. Since the hill hold control is also turned ON, it is possible to prevent the vehicle from moving backwards. Additionally, it is determined that there is a high probability that a transition to the HEV mode is carried out; therefore, a transmission torque capacity for eliminating backlash is set for the clutch CL in order to secure a state in which it is possible immediately to generate a torque transmission capacity when an engagement request of the clutch CL is received. After contacting the level difference, the driver maintains the depression amount of the accelerator pedal, thereby continuously requesting EV mode.

At time t31, a forced downshift is executed before the mode transition to the HEV mode. Specifically, the engine 1 is turned ON, and the target transmission ratio G* of the variator CVT is set to the transmission ratio G1 with which it is possible to pass over the level difference. Then, if the engine rotation speed Ne is increased, the variator CVT starts downshifting. At time t41, when the transmission ratio G of the variator CVT reaches the transmission ratio G1 with which it is possible to pass over the level difference, since EV mode has been continuously requested, the engine 1 is turned OFF, and the motor torque MotorTRQ that had been suppressed is recovered. In addition, since EV mode is being requested, the transmission torque capacity of the clutch CL maintains the state of eliminating backlash. Additionally, along with the engine 1 being turned OFF, the primary rotational frequency Npri and the secondary rotational frequency Nsec of the variator CVT are also reduced to approach the drive wheel rotational speed Nout. At time t51, the mode becomes the EV mode in a state in which the variator CVT has been downshifted and the hill hold control is turned OFF; however, the vehicle will not move backward due to the action of the motor torque MotorTRQ. Thereafter, for example, if the driver steps on the accelerator pedal and a mode transition request to the HEV mode is made, since the forced downshift to the variator CVT is already completed, the engine 1 is turned ON, and the transmission torque capacity of the clutch CL is increased to thereby allow an immediate passing over of the level difference and starting forward.

Figure 8:
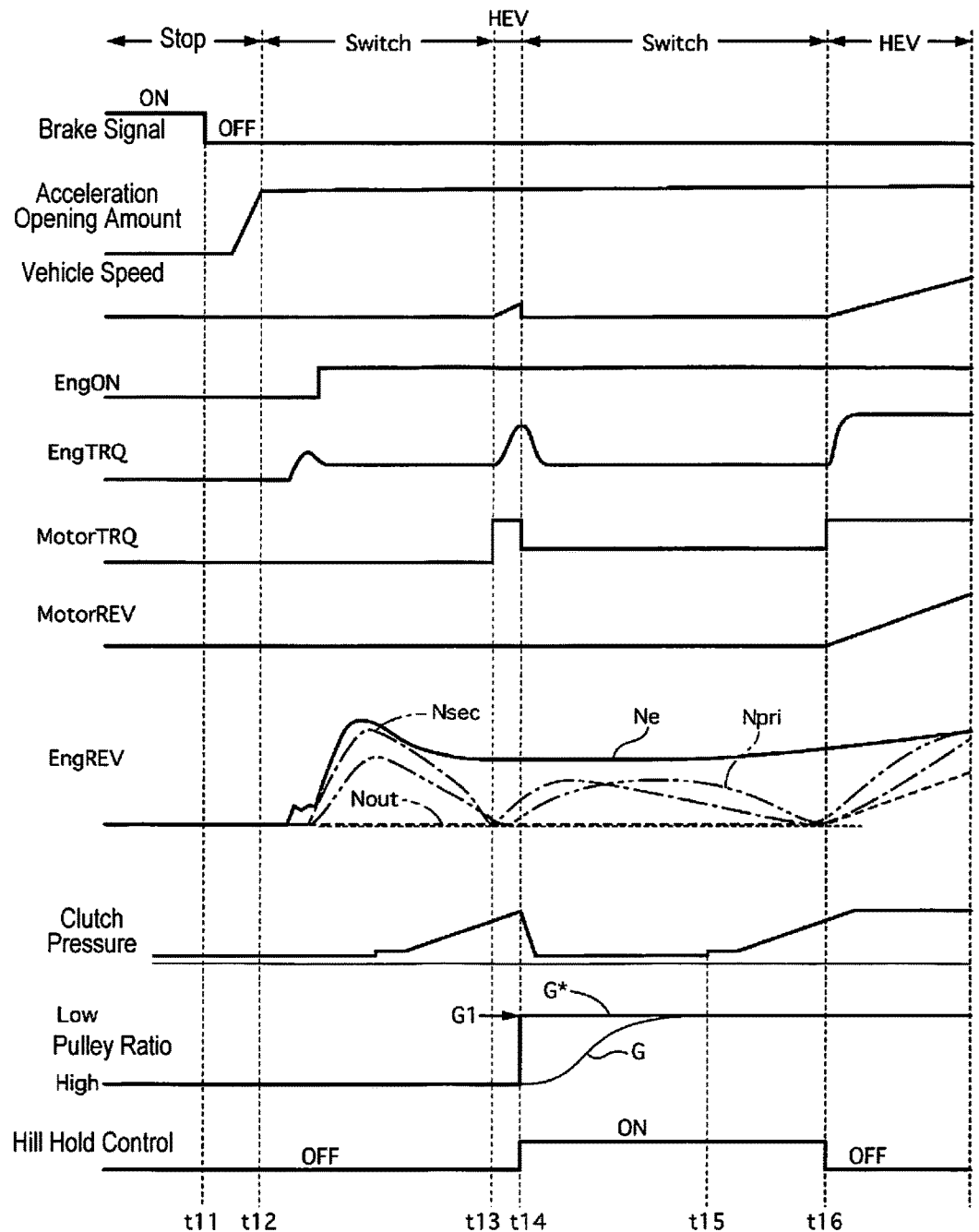
FIG. 8 is a time chart of when a level difference is determined while traveling in HEV mode in the hybrid vehicle of the first embodiment.

FIG. 8 is a time chart showing when a level difference is determined while traveling in HEV mode in the hybrid vehicle of the first embodiment. At time t11, the driver releases the brake pedal, after which the driver steps on the accelerator pedal to begin starting forward. At time t12, a transition request from the EV mode to the HEV mode is output, and the engine 1 is turned ON and a transmission torque capacity for eliminating backlash is set for the clutch CL. Then, accompanying a rise in the engine rotation speed Ne, the rotational speed of each pulley of the variator CVT is also increased. At this time, the transmission ratio G of the variator CVT is on the Higher side of the transmission ratio G1 with which it is possible to pass over the level difference, and the secondary rotational frequency Nsec is larger than the primary rotational frequency Npri. Then, following the completion of combustion in the engine 1, the engagement pressure of the clutch CL is gradually increased. At time t13, when the transmission torque capacity of the clutch CL becomes greater than or equal to a predetermined value, both the engine torque EngTRQ and the motor torque MotorTRQ are increased by the HEV mode.

At time t14, if the vehicle is less than the predetermined vehicle speed, even though the accelerator pedal opening amount is greater than or equal to the predetermined value, the motor torque MotorTRQ is greater than or equal to the predetermined value, and the engine torque EngTRQ is greater than or equal to the predetermined value, it is determined that there has been a contact with a level difference. At this time, the hill hold control is turned ON to start the forced downshift step. Specifically, the clutch CL is released to reduce the engine torque EngTRQ and the motor torque MotorTRQ, and the target transmission ratio of the variator CVT is set to the transmission ratio G1 with which it is possible to pass over the level difference. The transmission ratio of the variator CVT is thereby changed to the transmission ratio G1 with which it is possible to pass over the level difference, and the primary rotational frequency Npri becomes greater than the secondary rotational frequency Nsec.

At time t15, when the transmission ratio G of the variator CVT reaches the transmission ratio G1 with which it is possible to pass over the level difference, the transmission torque capacity of the clutch CL is gradually increased. Then, at time t16, when the transmission torque capacity of the clutch CL becomes greater than or equal to a predetermined value, the engine torque EngTRQ and the motor torque MotorTRQ are returned to values corresponding to the accelerator pedal opening amount and the hill hold control is turned OFF; the vehicle thereby passes over the level difference and starts forward.

As described above, the effects listed below can be obtained with the first embodiment.

(1) A hybrid vehicle control device, comprising an engine 1, a variator CVT that is coupled to an output shaft of the engine 1, a clutch CL that is coupled to an output shaft of the variator CVT, the drive wheel 5 that is coupled to an output shaft of the clutch CL, an electric motor 2 (motor) that is coupled to the drive wheel 5, and a hybrid controller 21 (control means) that controls the outputs of the engine 1 and the electric motor 2, the engagement and disengagement of the clutch CL, and the transmission ratio of the variator CVT, in accordance with the driving state, wherein a Step S6 (level difference determination means) for determining a presence/absence of a level difference is provided, and when it is determined that a level difference is present while in an EV mode (travel due to the drive force of the electric motor 2 with the clutch CL released and the engine 1 stopped), the hybrid controller 21 restarts the engine 1 while maintaining the released state of the clutch CL, and downshifts the variator CVT to a predetermined transmission ratio G1 with which it is possible to pass over the level difference.

That is, when there is a level difference while traveling due to the drive force of the electric motor 2, the variator CVT is downshifted by the engine 1 to a transmission ratio with which it is possible to pass over the level difference; therefore, even if the drive force of the electric motor 2 is insufficient and the drive force of the engine 1 is used, the engine torque is not reduced by the variator CVT and it is possible to pass over the level difference.

(2) When it is determined that a level difference is present in Step S6 while in the HEV mode (travel due to the drive force of the engine 1 with the clutch CL engaged), the clutch CL is released and the variator CVT is downshifted to the predetermined transmission ratio G1 with which it is possible to pass over the level difference. When carrying out a forced downshift while in HEV mode in this manner, since a load is not input from the drive wheel 5 side to the variator CVT, it is possible to quickly downshift the transmission ratio of the variator CVT to the transmission ratio G1 with which it is possible to pass over the level difference. The forced downshift is carried out after the level difference determination. In other words, a forced downshift is not particularly carried out if a level difference is not present; therefore, the impact on drivability is minimized by suppressing unnecessary downshifting to a minimum.

(3) A brake actuator 180 (braking means) that is capable of applying braking force to the drive wheel 5 is provided, and the hybrid controller 21 applies braking force to the drive wheel 5 in accordance with the release of the clutch CL. That is, a case is assumed in which, upon contacting a level difference, the tires are slightly riding on the level difference and the vehicle is stopped immediately before passing over. At this time, if the clutch CL is temporarily turned OFF after the next Step S26, there is the risk that the engine torque cannot be transmitted and the vehicle is pushed back and continues to move. Therefore, the movement of the vehicle is suppressed by turning the hill hold control ON and regulating the rotation of the tires.

(4) Even if it is determined that a level difference is present in Step S6, the hybrid controller 21 bypasses a step to carry out a forced downshift and prohibits a downshift, when the transmission ratio G of the variator CVT is greater than or equal to the transmission ratio G1 with which it is possible to pass over the level difference, that is, when the transmission ratio G is on the Lower side of the transmission ratio G1 with which it is possible to pass over the level difference, as illustrated in Step S7 and Step S24. That is, if the transmission ratio G is on the Lower side of the transmission ratio G1 with which it is possible to pass over the level difference, the transmission ratio G of the variator CVT is already in a state of being capable of outputting sufficient torque; therefore, it is possible to avoid an unnecessary engine start and a clutch release, etc., by prohibiting a forced downshift.

The present invention was described above on the basis of an embodiment, but the invention is not limited to the configurations described above, and other configurations are included in the present invention. A configuration was shown in the embodiment in which the engine is restarted with a starter motor 3, but other configurations are also possible. Specifically, in recent years, a technology has been put into practical use in which the alternator is replaced with a motor generator in a vehicle with an idling stop function; an alternator function is added to this motor generator to add an engine starting function; thus, engine restarting is carried out when the engine is restarted from an idling stop with this motor generator rather than the starter motor. The present invention may be configured so that engine restart is carried out by a motor generator described above.

In addition, in the embodiments regarding determinations in the mode map, the negative region of the vertical axis was determined on the basis of the ON or OFF of the brake switch 26, but the invention is not limited thereto; the determination may be based on an output value of a stroke sensor of the brake pedal 16, or the determination may be based on the output value of a brake fluid pressure sensor that detects the pressure of the master cylinder, etc.

The invention claimed is:

1. A hybrid vehicle control device comprising:
an engine;
a continuously variable transmission coupled to an output shaft of the engine;
a clutch coupled to an output shaft of the continuously variable transmission and being downstream of the continuously variable transmission;
a drive wheel coupled to an output shaft of the clutch;
an electric motor coupled to the drive wheel; and
at least one controller programmed to control outputs of the engine and the electric motor, an engagement and disengagement of the clutch, and a transmission ratio of the continuously variable transmission in accordance with a driving state,
the at least one controller being further programmed to determine a presence/absence of a level difference, and
upon determining the presence of a level difference and the motor is running, the at least one controller being further programmed to
restart the engine while maintaining a released state of the clutch, and
downshift the continuously variable transmission using the engine to a predetermined transmission ratio when the clutch is released to pass over the level difference.

2. The hybrid vehicle control device according to claim 1, wherein
the at least one controller is further programmed to release the clutch and downshift the continuously variable transmission to the predetermined transmission ratio for passing over the level difference.

3. The hybrid vehicle control device according to claim 2, further comprising
a braking device configured to apply a braking force to the drive wheel, and
the at least one controller is further programmed to apply the braking force to the drive wheel in accordance with the release of the clutch.

4. The hybrid vehicle control device according to claim 1, wherein
the at least one controller is further programmed to prevent downshifting when the transmission ratio of the continuously variable transmission is greater than or equal to the transmission ratio for passing over the level difference even upon determining the level difference is present.

5. The hybrid vehicle control device according to claim 2, wherein
the at least one controller is further programmed to prevent downshifting when the transmission ratio of the continuously variable transmission is greater than or equal to the transmission ratio for passing over the level difference even upon determining the level difference is present.

6. The hybrid vehicle control device according to claim 3, wherein
the at least one controller is further programmed to prevent downshifting when the transmission ratio of the continuously variable transmission is greater than or equal to the transmission ratio for passing over the level difference even upon determining the level difference is present.

* * * * *